Figure 1:
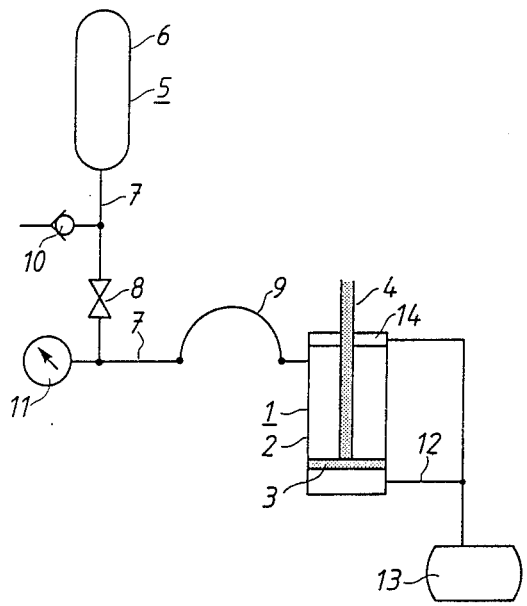

United States Patent [19]

Svensson et al.

[11] Patent Number: 4,904,150
[45] Date of Patent: Feb. 27, 1990

[54] BALANCING UNIT FOR PIVOTABLE MECHANICAL ELEMENTS, SUCH AS DOORS, ROBOT ARMS, ETC.

[75] Inventors: Roland Svensson, Västerås; Åke Österberg, Eskilstuna, both of Sweden

[73] Assignee: Asea Brown Boveri AB, Sweden

[21] Appl. No.: 192,910

[22] Filed: May 12, 1988

[30] Foreign Application Priority Data

May 29, 1987 [SE] Sweden ................. 8702255

[51] Int. Cl.$^4$ .................. B66C 23/00; F15B 1/00
[52] U.S. Cl. ................. 414/719; 188/382; 901/48; 74/469
[58] Field of Search ........... 901/48, 22; 414/719, 414/720, 673; 248/648, 364, 123.1, 162.1, 280.1, 297.1, 292.1; 74/469, 589, 590, 592, 479; 16/1 C, 289, 306; 212/195–198; 267/120, 64.27; 188/382, 311

[56] References Cited

U.S. PATENT DOCUMENTS

| | | | |
|---|---|---|---|
| 2,899,477 | 8/1959 | Cartoux | 901/48 X |
| 3,370,452 | 2/1968 | Sack et al. | 901/48 X |
| 3,721,416 | 3/1973 | Goudreau | 414/719 X |
| 3,745,608 | 7/1973 | Little | 16/1 C X |
| 3,865,424 | 2/1975 | Jabkowski | 901/48 X |
| 4,046,270 | 9/1977 | Baron et al. | 414/719 X |
| 4,297,908 | 11/1981 | Zimmer | 74/469 |
| 4,300,198 | 11/1981 | Davini | 414/719 X |
| 4,378,959 | 4/1983 | Susnjara | 901/48 X |
| 4,442,387 | 4/1984 | Lindbom | 901/48 X |
| 4,517,853 | 5/1985 | Tani et al. | 414/749 X |
| 4,598,601 | 7/1986 | Molaug | 248/648 X |
| 4,623,132 | 11/1986 | Smith | 16/306 X |
| 4,630,796 | 12/1986 | Kayser et al. | 248/364 X |
| 4,659,280 | 4/1987 | Akeel | 414/720 |
| 4,728,247 | 3/1988 | Nakashima et al. | 414/720 X |
| 4,734,006 | 3/1988 | Krob et al. | 414/719 |
| 4,753,128 | 6/1988 | Bartlett et al. | 16/1 C |

FOREIGN PATENT DOCUMENTS

| | | | |
|---|---|---|---|
| 0220935 | 4/1985 | Fed. Rep. of Germany | 901/48 |
| 0229953 | 11/1985 | Fed. Rep. of Germany | 901/48 |
| 0229954 | 11/1985 | Fed. Rep. of Germany | 901/48 |
| 1296400 | 3/1987 | U.S.S.R. | 414/719 |
| 1393349 | 5/1975 | United Kingdom | 901/48 |

OTHER PUBLICATIONS

*Hydraulic Handbook*, 2nd. Edition, published by Trade and Technical Press, Limited, Morden, Surrey, England, pp. 75–77, 158–166, 351, 1960.

Primary Examiner—Douglas C. Butler
Attorney, Agent, or Firm—Watson, Cole, Grindle, and Watson

[57] ABSTRACT

The invention relates to a balancing unit (1) for, for example, a movable arm in an industrial robot. The unit comprises a cylinder (2) with a piston (3) and a piston rod (4) arranged in the cylinder (2). The cylinder (2) is completely closed except for a sealed exit opening for the passage of the piston rod (4). On one side of the piston (3), the cylinder space is connected to a medium which is under high pressure, and on the other side of the piston (3) the cylinder space is connected, via a connection at the end of the cylinder (2), to a closed isolated space.

2 Claims, 2 Drawing Sheets

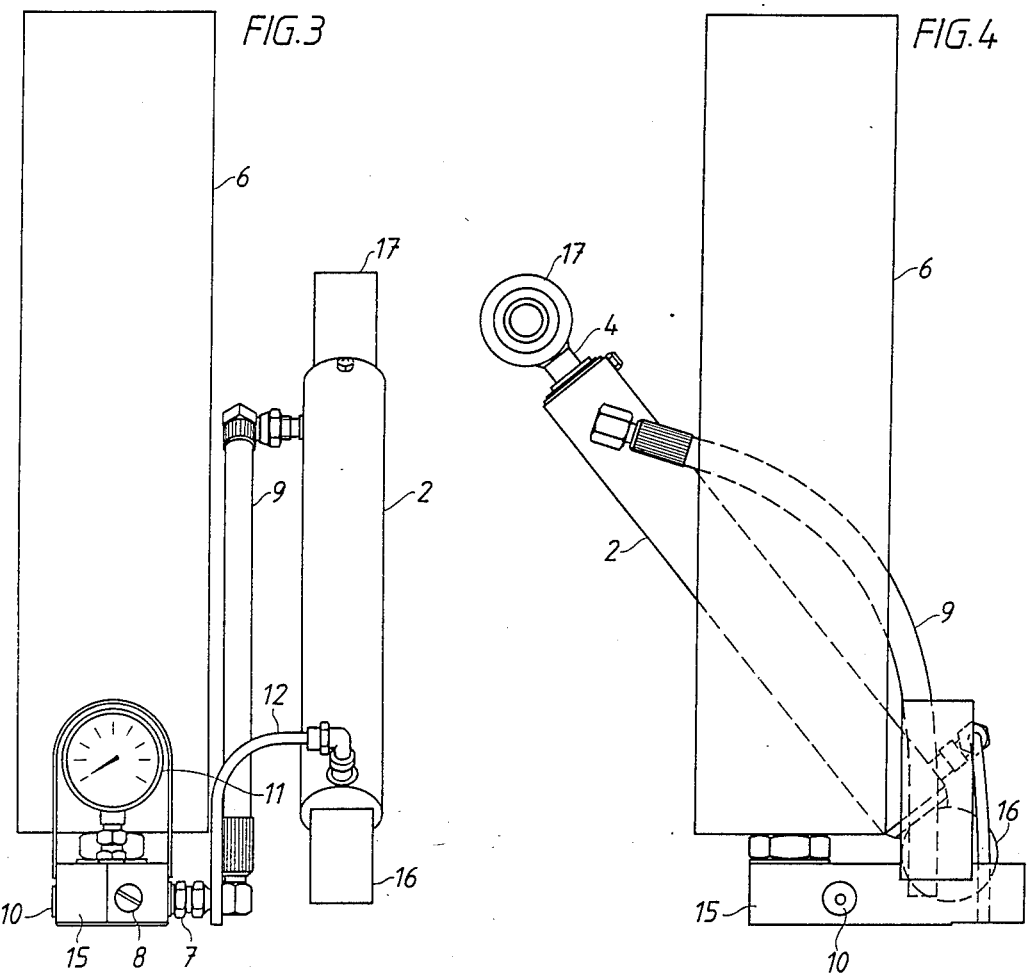
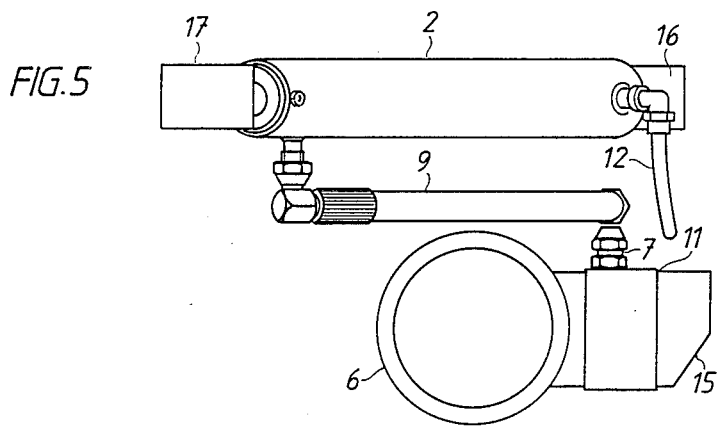

BALANCING UNIT FOR PIVOTABLE MECHANICAL ELEMENTS, SUCH AS DOORS, ROBOT ARMS, ETC.

The present invention relates to a balancing unit for, for example, the arm system of an industrial robot. The balancing unit often consists of a hydraulic power unit which is connected between the robot arm and the first axis of the robot. The power unit comprises a cylinder in which runs a piston with a piston rod. In the cylinder of prior art devices, one side of the piston is pressurized whereas the other side communicates with the surrounding atmosphere. When the piston moves back and forth in the cylinder—"breathes"—a great deal of dirt is drawn into the cylinder, the packings and walls of which are then rapidly destroyed.

According to the present invention, the above-mentioned problem is eliminated by making the cylinder completely closed except for a sealed exit opening for the passage of the piston rod. The cylinder space on one side of the piston is connected to a medium which is under high pressure and the cylinder space on the other side of the piston is connected, via a connection at the end of the cylinder, to a closed space. The space may suitably consist of a separate container. This arrangement prevents dirt from being drawn into the cylinder and the working life of the cylinder is considerably increased. In addition, the separate container serves as a collecting member for the hydraulic oil, or the like, which leaks past the piston. The condition of the seal between the piston and the cylinder can thus be determined by the amount of leaking oil in the piston.

Figure 2:
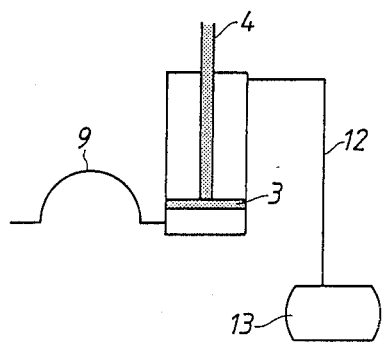
Figure 6:
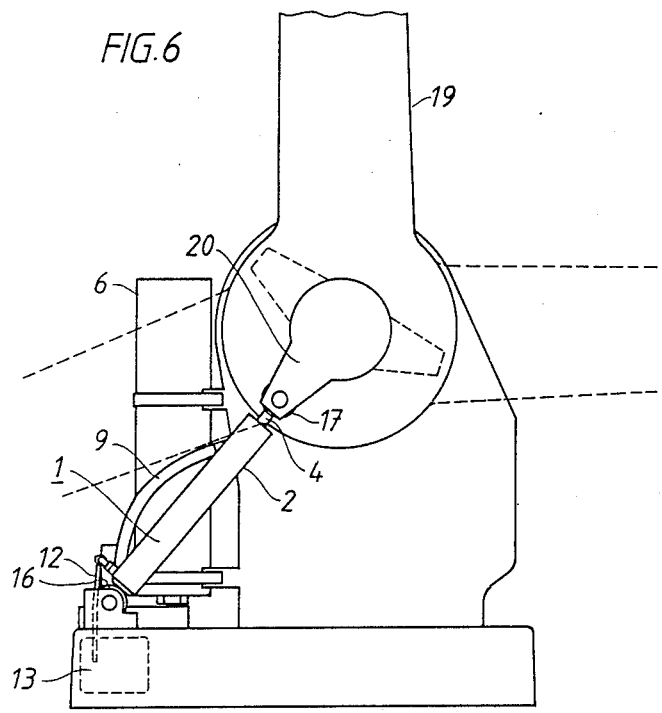

The invention will be best understood with reference to the accompanying drawing, wherein FIGS. 1-2 represent a diagram of connections for the invention, FIGS. 3, 4 and 5 represent an embodiment of the balancing unit connected to a high pressure accumulator, and FIG. 6 shows the balancing unit and the accumulator mounted on a robot.

In FIG. 1, 1 designates the balancing unit consisting of a cylinder 2 and a piston 3 arranged therein and connected to a piston rod 4. A power accumulator 5 consists of a cylinder 6 with a piston (not shown) located therein, which separates a lower space for hydraulic oil and an upper space for gas under high pressure. The pressure in the gas is normally as high as 100 bar, which in turn means that the hydraulic oil is under the same pressure. By way of a conduit 7, a cut-off cock 8 and a flexible tube 9, the accumulator 5 communicates with the cylinder 2 on one side of the piston 3. Also a nonreturn valve 10 is connected to the conduit 7. Through this nonreturn valve 10 hydraulic oil can be filled onto the system, the pressure of which is measured by a manometer 11.

On the other side of the piston, in relation to the point of connection of the tube 9, a tube 12 is connected. This tube 12 leads to a container 13. This container 13 is normally connected to the cylinder 2 when the piston 3 is in its upper position and when atmospheric pressure prevails in the cylinder 2 and the container 13. When the piston 3 arrives at its second, lower end position, a lower overpressure, about 0.5 bar, is consequently obtained in this space.

The way the balancing unit 1 is shown in FIG. 1, it develops a tensile force when the pressure in the accumulator 5 is switched on, i.e. the piston 3 strives to pull the piston rod 4 into the cylinder 2. In addition, a pressure-relieved space 14 can be arranged in the upper part of the cylinder 2, which space 14 communicates with the container 13. In this way, the leaking oil which is conducted, via the piston rod 4, into the space 14 from the pressurized space in the cylinder 2 is utilized.

If it is desired that the balancing unit 1 should develop a compressive force, the connection of the unit 1 must be changed, as will be clear from FIG. 2. In this case, the pressure oil enters the cylinder 2 below the piston 3 and strives to press the piston rod 4 out of the cylinder 2.

FIG. 3 shows the device seen from the front with the same designations as are used in FIG. 1. The cylinder 6 is arranged on a connection block 15 which comprises both a filling opening with a nonreturn valve 10, located inside it, and a cut-off cock 8. At one end the cylinder 2 is provided with a means of attachment 15 for pivotable attachment to, for example, the first axis of a robot, whereas at the other end the piston rod 4 is provided with a corresponding means of attachment 17 for attachment to a movable robot arm.

FIGS. 4 and 5 show the device according to FIG. 3 seen from the side and from above.

FIGS. 4 and 5 do not show the container 13 but they do show the tube 12 leading to this container 13. It should also be noted that the tube 9 must be flexible and arcuately connected, since the distance between its points of connection varies when the balancing unit 1 swings together with the robot arm which is to be counterbalanced by the unit 1.

FIG. 6, finally, shows the balancing unit 1 connected into a robot which is conceived to be mounted standing on a floor. The connection has been performed by pivotally connecting the attachment means 16 to the first axis 18 of the robot and by connecting the attachment means 17 of the piston rod 4 to a lever 20 mounted on the robot arm 19. In this case, with a standing robot, the balancing unit 1 is to operate with tensile force and the connection is to be performed as shown in FIG. 1, i.e. the connection to the closed container 13 is performed from the lower part of the cylinder 2 via the tube 12. FIG. 6 also shows, in dashed lines, the possible end deflection of the robot arm 19 and the corresponding positions of the lever 20.

In the case of a robot of the shown design, which is suspended from the roof, the balancing unit must deliver a compressive force and the switching of the connections to the cylinder 2 must be performed as shown in FIG. 2. Thus, in this case the container 13 must be connected to the other end of the cylinder 2.

In both of the above-mentioned cases, the object of the invention is achieved, namely, to prevent dirt from entering the cylinder 2 from the non-pressurized space on one side of the piston 3, which normally occurs in prior art devices in which this space communicates freely with the surrounding atmosphere. Another advantage is that by looking into the container 13 it can be discovered whether oil in the cylinder 2 leaks past the piston 3 and runs down into the container 13 via the tube 12. The larger the quantity of oil in this container 13, the more inferior will be the seal between the cylinder 2 and the piston 3. Thus, a large quantity of oil in the container 13 gives a clear indication that the balancing unit 1 must be replaced or renovated.

We claim:

1. A balancing unit for moving pivotable mechanical elements which comprises:

a cylinder having an interior and defining a first end wall and a second end wall, a piston having a piston head which is positioned in the interior of said cylinder and a piston rod which extends away from said piston head and sealingly through an opening in said first end wall, said piston head dividing the interior of said cylinder into first and second spaces on opposite sides of said piston head, a high pressure system for supplying a high pressure medium to said first space, a container defining a closed third space, and means connecting said second space with said closed third space consisting of a tube to convey to said closed third space any high pressure medium which has leaked from said first space past said piston head into said second space, wherein said cylinder includes an interior wall between said first end wall and said second end wall and through which said piston rod extends, said first end wall and said interior wall defining a fourth space therebetween, and including means connecting said fourth space with said closed third space so as to convey to said closed third space any high pressure medium which has leaked from the interior of said cylinder past said interior wall into said fourth space.

2. The combination of a pivotable robot arm and a balancing unit for pivoting the robot arm, said balancing unit comprising:

a cylinder having an interior and defining a first end wall and a second end wall, a piston having a piston head which is positioned in the interior of said cylinder and a piston rod which extends away from said piston head and sealingly through an opening in said first end wall, said piston head dividing the interior of said cylinder into first and second spaces on opposite sides of said piston head and said piston rod being connected to said robot arm, a high pressure system for supplying a high pressure medium to said first space, a container defining a closed third space, means connecting said second space with said closed third space consisting of a tube to convey to said closed third space any high pressure medium which has leaked from said first space part said piston head into said second space, and wherein said cylinder includes an interior wall between said first end wall and said second end wall and through which said piston rod extends, said first end wall and said interior wall defining a fourth space therebetween, and including means connecting said fourth space with said closed third space so as to convey to said closed third space any high pressure medium which has leaked from the interior of said cylinder past said interior wall into said fourth space.

* * * * *